United States Patent
Wu et al.

(10) Patent No.: US 11,011,926 B2
(45) Date of Patent: May 18, 2021

(54) ADAPTIVE CHARGER

(71) Applicant: SCHNEIDER ELECTRIC IT CORPORATION, West Kingston, RI (US)

(72) Inventors: Shang-Lin Wu, New Taipei (TW); Sheng-Hsien Fang, New Taipei (TW)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 75 days.

(21) Appl. No.: 16/026,237

(22) Filed: Jul. 3, 2018

(65) Prior Publication Data

US 2020/0014237 A1   Jan. 9, 2020

(51) Int. Cl.
| | | |
|---|---|---|
| *H02J 7/00* | (2006.01) | |
| *H02J 7/04* | (2006.01) | |
| *H01F 27/30* | (2006.01) | |
| *H01M 10/44* | (2006.01) | |

(52) U.S. Cl.
CPC ............ *H02J 7/045* (2013.01); *H01F 27/303* (2013.01); *H01M 10/44* (2013.01); *H02J 7/008* (2013.01); *H02J 2207/10* (2020.01)

(58) Field of Classification Search
CPC ...................................................... H02J 7/045
USPC ............................................................ 320/134
See application file for complete search history.

(56) References Cited

U.S. PATENT DOCUMENTS

| | | | | |
|---|---|---|---|---|
| 6,111,764 A | * | 8/2000 | Atou | H02J 9/062 307/66 |
| 8,314,593 B2 | * | 11/2012 | Yeh | H02J 9/062 320/107 |
| 2002/0030411 A1 | * | 3/2002 | Curtis | H02J 9/062 307/64 |
| 2002/0140403 A1 | * | 10/2002 | Reddy | H02J 9/062 320/162 |
| 2003/0026113 A1 | * | 2/2003 | Reilly | H02J 9/062 363/37 |
| 2015/0061385 A1 | * | 3/2015 | Nommensen | H02J 9/06 307/23 |
| 2017/0237357 A1 | | 8/2017 | Chen et al. | |

FOREIGN PATENT DOCUMENTS

EP   0019932 A1   12/1980

OTHER PUBLICATIONS

Extended European Search Report from corresponding European Application No. 19182725.2 dated Oct. 7, 2019.

* cited by examiner

*Primary Examiner* — Yalkew Fantu
(74) *Attorney, Agent, or Firm* — Lando & Anastasi, LLP

(57) ABSTRACT

According to at least one aspect of the present disclosure, a method of operating a, Uninterruptible Power Supply (UPS) is provided. The method includes receiving, in a first mode of operation, AC power at an input of the UPS, providing, in the first mode, the AC power to a charger and a clamp-charger circuit, charging, by the charger in the first mode, a UPS battery of the UPS with a first charging current derived from at least a portion of the AC power, charging, by the clamp-charger circuit in the first mode, the UPS battery with a second charging current derived from at least a portion of the AC power, providing, in a second mode of operation, output power at an output of the UPS derived from the UPS battery, and charging, by the clamp-charger circuit in the second mode, the UPS battery using a third charging current.

20 Claims, 9 Drawing Sheets

ADAPTIVE CHARGER

BACKGROUND OF THE INVENTION

1. Field of the Invention

At least one example in accordance with the present invention relates generally to clamp circuits.

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPSs, offline UPSs, line interactive UPSs, as well as others. Online UPSs provide conditioned AC power as well as back-up AC power upon interruption of a primary source of AC power. Offline UPSs typically do not provide conditioning of input AC power, but do provide back-up AC power upon interruption of the primary AC power source. Line interactive UPSs are similar to off-line UPSs in that they switch to battery power when a blackout occurs but also typically include a multi-tap transformer for regulating the output voltage provided by the UPS.

A conventional offline UPS normally connects a load directly to utility power when mains power is available. The conventional offline UPS also includes a charger which uses the utility mains power to charge a backup power source (e.g., a battery). When utility power is insufficient to power the load, the offline UPS operates a DC-AC inverter to convert DC power from the backup power source into desired AC power, which is provided to the load.

SUMMARY

According to at least one aspect of the present invention, a method of operating an Uninterruptible Power Supply (UPS) is provided. The method includes receiving, in a first mode of operation, AC power at an input of the UPS, providing, in the first mode of operation, the AC power to a charger and a clamp-charger circuit, charging, by the charger in the first mode of operation, a UPS battery of the UPS with a first charging current derived from at least a portion of the AC power, charging, by the clamp-charger circuit in the first mode of operation, the UPS battery with a second charging current derived from at least a portion of the AC power, providing, in a second mode of operation, output power at an output of the UPS derived from the UPS battery, and charging, by the clamp-charger circuit in the second mode of operation, the UPS battery using a third charging current.

In some embodiments, the method further includes sensing, by a voltage regulator, parameters indicative of the first charging current and the second charging current in the first mode of operation. In one embodiment, the method further includes generating, by the voltage regulator, feedback signals based on the sensed parameters and controlling the clamp-charger circuit based on the feedback signals. In some embodiments, the method includes regulating, by the clamp-charger circuit, the second charging current and the third charging current based on the feedback signals.

In one embodiment, the method further includes receiving, in the second mode of operation, power at the output of the UPS. In some embodiments, receiving power at the output of the UPS includes receiving power discharged from a load capacitance. In one embodiment, charging the UPS battery includes charging the UPS battery with the third charging current derived from at least a portion of the output power.

According to an embodiment, an Uninterruptible Power Supply (UPS) system is provided. The UPS system includes an input configured to receive input AC power, an output configured to provide output AC power to a load, a battery charger coupled to the input and configured to couple to a battery, the battery charger being configured to receive, in a first mode of operation, a first portion of the input AC power from the input, and provide, in the first mode of operation, a first charging current to the battery, the first charging current derived from the first portion of the input AC power. The UPS system further includes a clamp-charger circuit coupled to the output and the battery, the clamp-charger circuit being configured to receive, in the first mode of operation, a second portion of the input AC power from the input, provide, in the first mode of operation, a second charging current to the battery, the second charging current derived from the second portion of the input AC power, provide, in a second mode of operation, power derived from the battery to the load, and charge, in the second mode of operation, the battery.

In one embodiment, the clamp-charger circuit is further configured to receive, at the output in the second mode of operation, power from a load capacitance. In some embodiments, the UPS system includes a voltage regulator coupled to the battery charger and the clamp-charger circuit. In one embodiment, the voltage regulator is configured to sense, in the first mode of operation, parameters indicative of the first charging current and the second charging current. In one embodiment, the voltage regulator is further configured to generate feedback signals based on the sensed parameters, and communicate the feedback signals to the clamp-charger circuit. In some embodiments, the clamp-charger circuit is a DC/DC flyback converter.

In one embodiment, the DC/DC flyback converter includes an input configured to receive input power, an output configured to be coupled to the battery, a transformer coupled between the input and the output, the transformer including a primary winding, a switch coupled in series with the primary winding, at least one optocoupler configured to be coupled to the voltage regulator, and a Pulse Width Modulation (PWM) controller coupled to the at least one optocoupler and coupled to the switch. In some embodiments, the PWM controller is configured to receive the feedback signals from the at least one optocoupler, generate switching signals based on the feedback signals, and provide the switching signals to the switch to control a current through the primary winding. In some embodiments, controlling the current through the primary winding includes controlling an output current provided by the transformer to the output.

According to an embodiment, an Uninterruptible Power Supply (UPS) system is provided. The UPS system includes an input configured to receive input AC power, an output configured to provide output AC power to a load, a battery charger coupled to the input and configured to couple to a battery, the battery charger being configured to receive, in a first mode of operation, a first portion of the input AC power from the input, and provide, in the first mode of operation, a first charging current to the battery, the first charging current derived from the first portion of the input AC power, a clamp-charger circuit coupled to the output and the battery, and means for charging, in the first mode of operation, the battery with the clamp-charger circuit.

In one embodiment, the UPS system further includes means for receiving, in a second mode of operation, DC power from the load. In some embodiments, the means for charging the battery includes means for receiving, in the first mode of operation, a second portion of the input AC power from the input, and providing, in the first mode of operation, a second charging current to the battery, the second charging current derived from the second portion of the input AC power. In one embodiment, the UPS system includes means for providing, in the second mode of operation, a third charging current to the battery, the third charging current being derived from the battery.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE INVENTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Embodiments of the present disclosure refer generally to clamp circuits implemented in Uninterruptible Power Supplies (UPSs). For example, a clamp circuit which may be implemented in a UPS is described in U.S. patent application Ser. No. 15/042,444, filed Feb. 12, 2016, which is hereby incorporated herein in its entirety. The clamp circuit is generally configured to improve the efficiency of the UPS by recycling power from a load capacitance ("Xcap").

Figure 1:
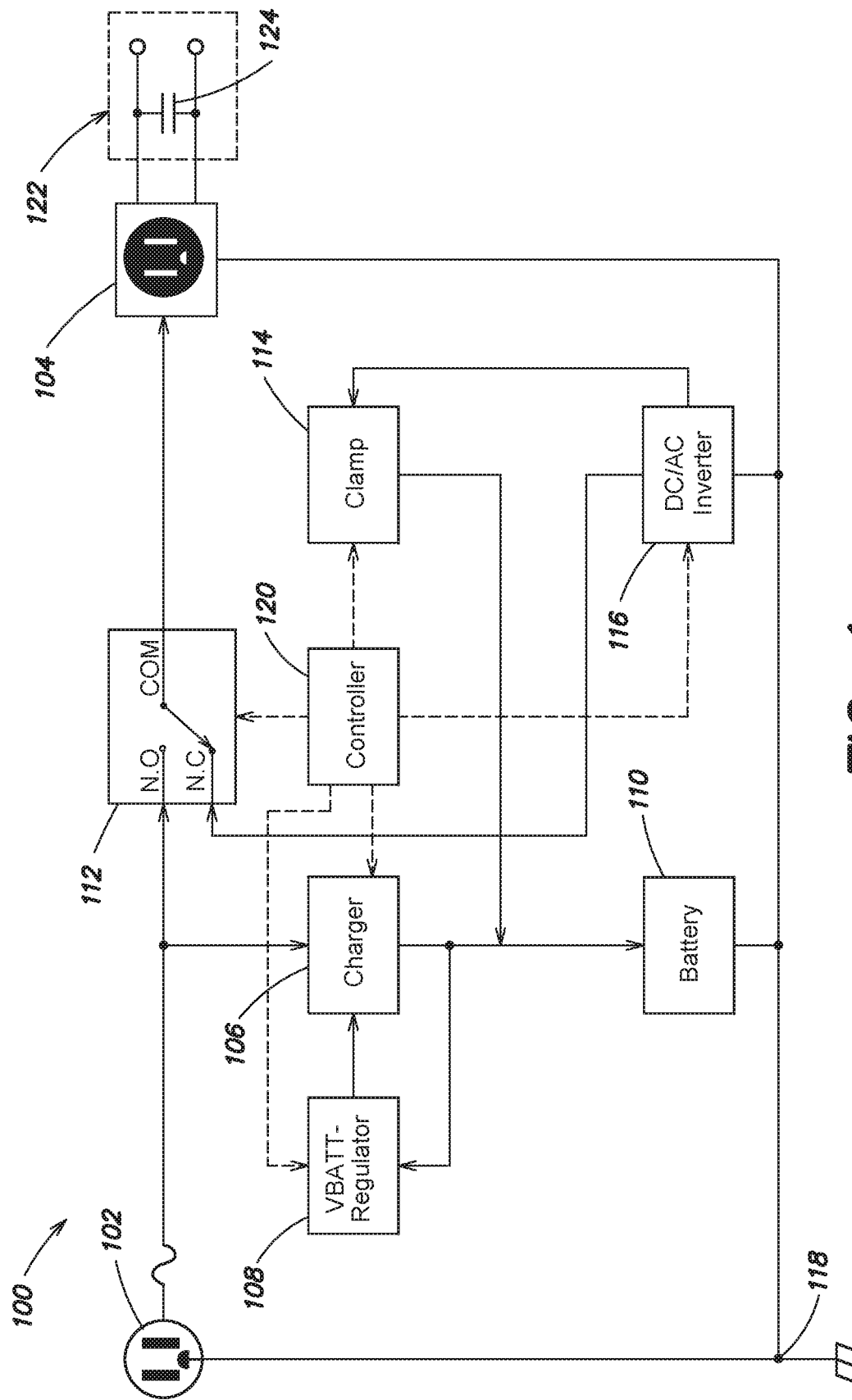
FIG. 1 illustrates a block diagram of a conventional offline UPS.

FIG. 1 illustrates an example of a conventional offline UPS, generally indicated at 100, coupled to a load 122. The UPS 100 includes an input 102, an output 104, a charger 106, a voltage regulator 108, a battery 110, a relay 112, a clamp circuit 114, an inverter 116, a reference terminal 118 (for example, a ground terminal), and a controller 120. The load 122 includes a load capacitance 124.

The input 102 is coupled to the charger 106, the relay 112, and the reference terminal 118. The output 104 is coupled to the relay 112, the reference terminal 118, and the load 122. The charger 106 is coupled to the input 102, the voltage regulator 108, and the battery 110, and is communicatively coupled to the controller 120. The voltage regulator 108 is coupled to the charger 106, the battery 110, and the clamp circuit 114, and is communicatively coupled to the controller 120. The battery 110 is coupled to the charger 106, the voltage regulator 108, the clamp circuit 114, the inverter 116, and the reference terminal 118.

The relay 112 is coupled to the input 102, the output 104, and the inverter 116, and is communicatively coupled to the controller 120. The clamp circuit 114 is coupled to the voltage regulator 108, the battery 110, and the inverter 116, and is communicatively coupled to the controller 120.

The inverter 116 is coupled to the battery 110, the relay 112, the clamp circuit 114, and the reference terminal 118, and is communicatively coupled to the controller 120. The reference terminal 118 is coupled to the input 102, the output 104, the battery 110, and the inverter 116. The controller 120 is configured to be communicatively coupled to the charger 106, the voltage regulator 108, the relay 112, the clamp circuit 114, and the inverter 116.

The UPS 100 is generally configured to operate in one of at least two modes of operation, including a line mode and a battery mode. The mode of operation of the UPS 100 is dependent upon a quality level of AC power received at the input 102 (for example, from a utility mains AC power supply).

For example, if the controller 120 determines that the AC power received at the input 102 is acceptable (i.e., within a specified range of acceptable electrical parameters), then the UPS 100 may be configured to operate in the line mode.

Otherwise, if the controller 120 determines that the AC power received at the input 102 is not acceptable (i.e., not within a specified range of acceptable electrical parameters), then the UPS 100 may be configured to operate in the battery mode.

In the line mode, the controller 120 actuates the relay 112 to connect the input 102 to the output 104. The input 102 receives AC power from an external source (for example, from a utility mains AC power supply) and provides the received power to the output 104 and to the charger 106. The output 104 receives the power from the input 102 and provides the power to the load 122. The charger 106 receives the AC power from the input 102 and charges the battery 110 with the AC power. The voltage regulator 108 senses electrical parameters of the charger 106 output (including, for example, voltage parameters) and modulates the charger 106 output based on the sensed electrical parameters.

The charger 106 may be rated at a specific charging power level to meet a maximum permitted battery recharge time specified by a designer of the UPS 100. For example, where the battery 110 has a specific energy storage capacity, the designer may specify that the battery 110 must be fully recharged after no more than 12 hours of charging. In some examples, this design constraint requires that the charger 106 be rated at a charging power level of approximately 15 W.

In the battery mode, acceptable AC power is not available at the input 102. Accordingly, no AC power is provided from the input 102 to either the output 104 or the charger 106. The charger 106 discontinues charging the battery 110, and the battery 110 discharges stored DC power to the inverter 116. The inverter 116 converts the received DC power to AC power, and provides the AC power to the output 104 via the relay 112 to provide electrical power to the load 122.

In some examples, the load 122 may include a load capacitance 124 which stores reactive power. The load capacitance may be considered undesirable, because if the stored reactive power is not utilized to perform useful work, the power may be wasted (e.g., dissipated as heat), thereby lowering the efficiency of a UPS supplying power to the load. To improve UPS efficiency, some conventional inverters, such as the inverter 116, may be configured to recycle the reactive power stored in the load capacitance 124 during the battery mode of operation.

For example, the inverter 116 may be configured to hold an output voltage of the inverter 116 at zero to discharge the reactive power stored in the load capacitance 124 to the inverter 116. The inverter 116 provides the discharged reactive power to the clamp circuit 114, which charges the battery 110 with the recycled reactive power. The efficiency of the UPS 100 can therefore be increased by recycling reactive power stored by the load capacitance 124 and charging the battery 110 with the recycled reactive power.

The clamp circuit 114 does not charge the battery 110 during the line mode of operation, because the UPS 100 does not recycle reactive power stored in the load capacitance 124 during the line mode of operation. Conversely, the charger 106 is only active during the line mode of operation, and is typically required to recharge the battery 110 in a specified maximum amount of time as discussed above.

In at least some embodiments discussed herein, a clamp circuit of an offline UPS charges a UPS battery in parallel with a primary battery charger during a line mode of operation. Because the clamp circuit provides a portion of the battery charging power, the power rating of the primary battery charger may be reduced. Reducing the power rating of the primary battery charger enables the implementation of a smaller and less expensive charger, while still fully recharging the UPS battery in a specified maximum amount of time.

Figure 2:
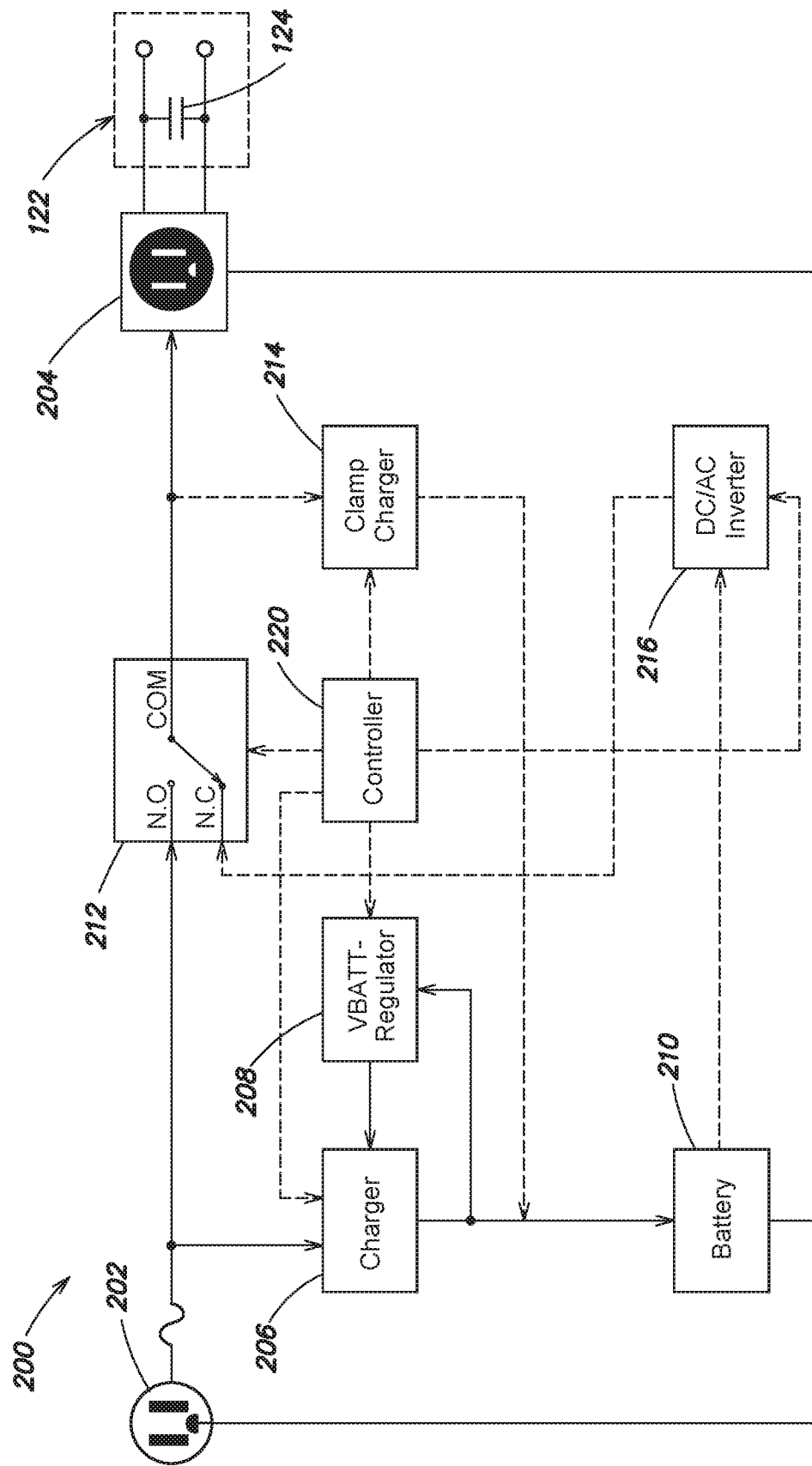
FIG. 2 illustrates a block diagram of an offline UPS according to an embodiment.

FIG. 2 illustrates a block diagram of a UPS 200 configured to be coupled to the load 122 according to one embodiment. The UPS 200 includes an input 202, an output 204, a charger 206, a voltage regulator 208, a battery 210, a relay 212, a clamp-charger circuit 214, an inverter 216, a reference terminal 218 (e.g., a ground terminal), and a controller 220. The UPS 200 is similar to the UPS 100, except that the clamp circuit 114 is replaced with the clamp-charger circuit 214. The load 122 includes the load capacitance 124.

The input 202 is coupled to the charger 206, the relay 212, the reference terminal 218, and, in some embodiments, is coupled to an external AC power source, such as a utility mains power supply (not illustrated). The output 204 is coupled to the relay 212, the reference terminal 218, and the load 122. The charger 206 is coupled to the input 202, the voltage regulator 208, and the battery 210, and is communicatively coupled to the controller 220. The voltage regulator 208 is coupled to the charger 206 and the clamp-charger circuit 214, and is communicatively coupled to the controller 220. The battery 210 is coupled to the charger 206, the clamp-charger circuit 214, and the reference terminal 218, and is communicatively coupled to the controller 220. Although the battery 210 is illustrated as being internal to the UPS 200 in FIG. 2, in alternate embodiments, the battery 210 may be external to the UPS 200.

The relay 212 is coupled to the input 202, the output 204, and the inverter 216, and is communicatively coupled to the controller 220. The clamp-charger circuit 214 is coupled to the output 204, the voltage regulator 208, the battery 210, and the relay 212, and is communicatively coupled to the controller 220. The inverter 216 is coupled to the battery 210 and to the relay 212, and is communicatively coupled to the controller 220. The reference terminal 218 is coupled to the input 202, the output 204, and the battery 210.

The input 202 is generally configured to receive electrical power from an external power supply, such as a utility mains power supply (not illustrated). The input 202 provides the received power to the charger 206, and to the output 204 via the relay 212. The output 204 is generally configured to receive electrical power from the relay 212, and provide the received electrical power to the load 122.

In the line mode of operation, the relay 212 connects the input 202 to the output 204 to provide electrical power to the output 204. In the battery mode of operation, the relay 212 connects the inverter 216 to the output 204 to provide electrical power to the output 204. In some embodiments, during the battery mode of operation, the load 122 may discharge reactive power stored in the load capacitance 124 to the output 204.

The charger 206 is generally configured to receive electrical power from the input 202, and charge the battery 210 using the received electrical power. More specifically, the charger 206 may be configured to provide a constant charging current at a constant voltage to the battery 210. The voltage regulator 208 is generally configured to detect an output of the charger 206 and an output of the clamp-charger circuit 214, and provide voltage feedback signals indicative of the output of the charger 206 and the clamp-charger circuit 214. The battery 210 is generally configured to store electrical energy provided by the charger 206 and the clamp-charger circuit 214, and discharge the stored electrical energy to the inverter 216.

The relay 212 is generally configured to connect the output 204 to one of the input 202 and the inverter 216. For example, the relay 212 may be configured to connect the output 204 to the input 202 in a line mode of operation, and may be configured to connect the output 204 to the inverter 216 in a battery mode of operation. The clamp-charger circuit 214 is generally configured to provide recycled load reactive power to the battery 210 in a battery mode of operation, and is configured to provide a charging current to the battery 210 in a line mode of operation.

The inverter 216 is generally configured to provide power from the battery 210 to the output 204 in a battery mode of operation. For example, in the battery mode of operation, the inverter 216 may be configured to receive stored DC power from the battery 210, convert the DC power to AC power, and provide the AC power to the output 204 via the relay 212. The controller 220 is generally configured to exchange control and communication signals with components of the UPS 200.

In operation, the UPS 200 is generally configured to operate in one of three modes of operation, including a standby mode of operation, a line mode of operation, and a battery mode of operation. In at least one embodiment the controller 220 is configured to receive measurement data (including, for example, input voltage measurement data, input current measurement data, and so forth), analyze the measurement data, and select a mode of operation based on results of the analysis. The controller 220 can subsequently control components of the UPS 200 consistent with the selected mode of operation.

Figure 3:
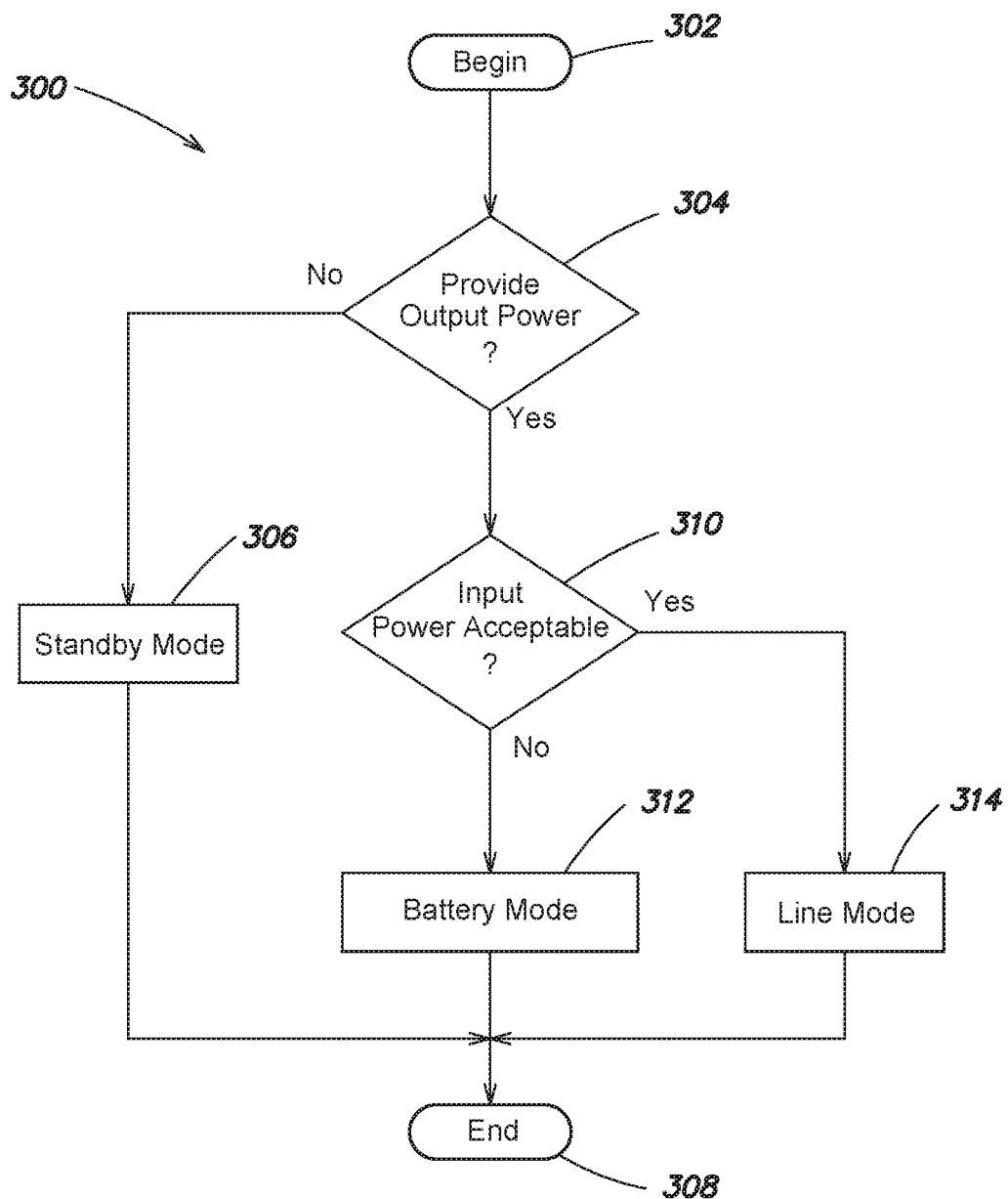
FIG. 3 illustrates a process of determining a mode of operation of a UPS.

FIG. 3 illustrates a process 300 to determine a mode of operation of the UPS 200. For example, in some embodiments, the process 300 may be executed by the controller 220. At act 302, the process 300 begins. At act 304, a determination is made as to whether to provide power to the output 204. For example, if the output 204 is not connected to a load, or if the load is powered off, then the controller 220 may determine not to provide power to the output 204.

If no power is to be provided to the output 204 (304 NO), then the process 300 continues to act 306. At act 306, a standby mode is entered, as discussed in greater detail below with reference to FIG. 4. The process 300 continues to act 308, and the process 300 ends.

Otherwise, if power is to be provided to the output 204 (304 YES), then the process 300 continues to act 310. At act 310, an evaluation is made as to whether the input power provided to the input 202 is acceptable. Acceptable power may be defined as power having parameters within a specific range. For example, power having a sinusoidal waveform may be considered acceptable if the voltage of the sinusoidal waveform does not deviate by more than a threshold amount from an ideal sinusoidal waveform having approximately the same target frequency, phase, and amplitude.

If the power at the input 202 is not acceptable (310 NO), then the process 300 continues to act 312. At act 312, a battery mode is entered, as discussed in greater detail below with respect to FIG. 6. The process 300 continues to act 308, and the process 300 ends. Otherwise, if the power at the input 202 is acceptable (310 YES), then the process 300 continues to act 314. At act 314, a line mode is entered, as discussed in greater detail below with reference to FIG. 5. The process 300 continues to act 308, and the process 300 ends.

Figure 4:
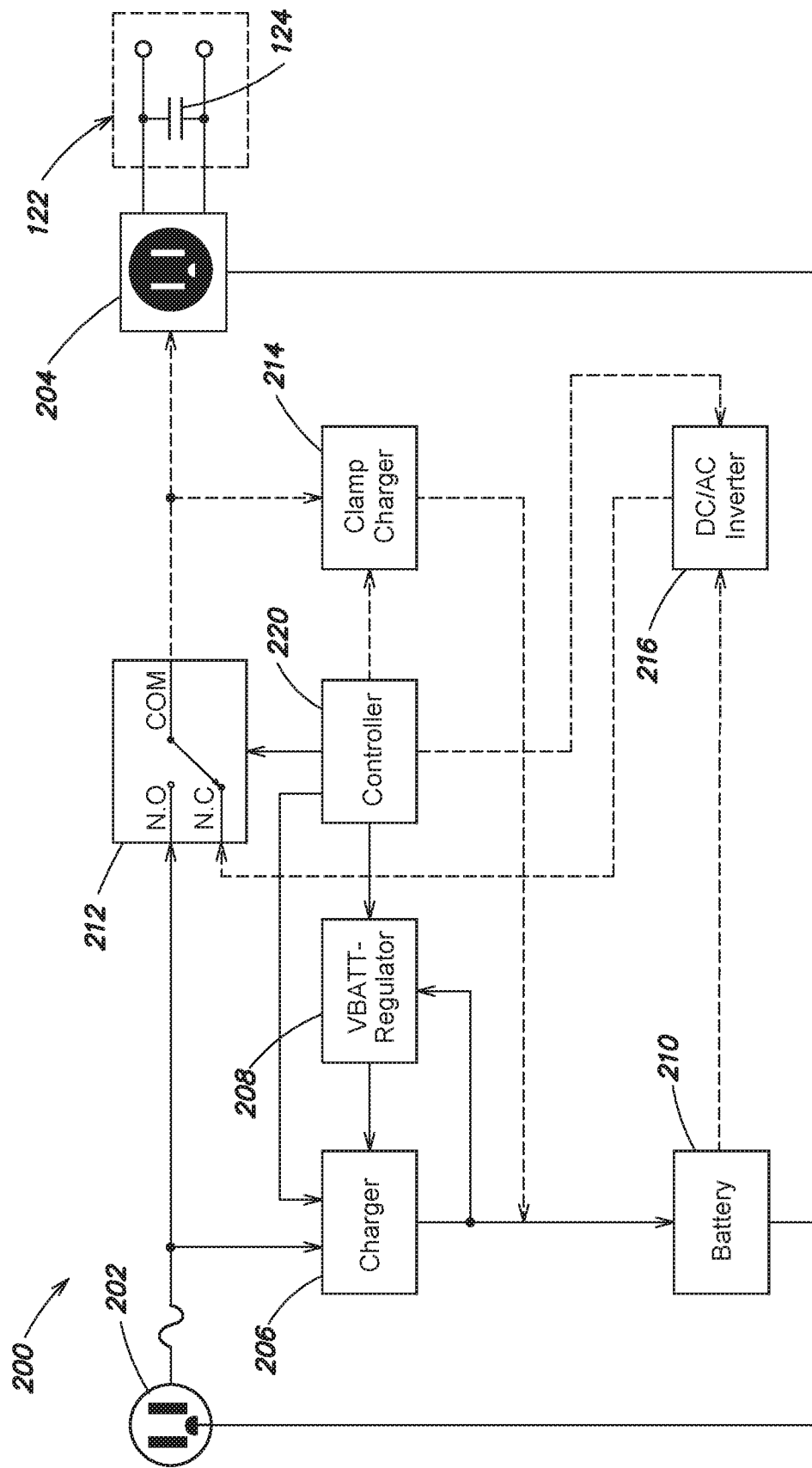
FIG. 4 illustrates a block diagram of the offline UPS in a standby mode of operation according to an embodiment.

The standby mode of operation will now be described with reference to FIG. 4. FIG. 4 illustrates the UPS 200 and the load 122 in the standby mode. In the illustrated embodiment, solid-line connections represent active (e.g., electrically-energized) connections, whereas dotted-line connections indicate inactive (e.g., electrically-deenergized) connections.

As discussed above with respect to act 306, electrical power is not provided to the output 204 in the standby mode of operation. Electrical power received at the input 202 is provided to the charger 206, and the charger 206 charges the battery 210 with the electrical power received from the input 202. The voltage regulator 208 senses the output of the charger 206, and communicates voltage feedback signals to the charger 206 based on the sensed parameters.

Figure 6:
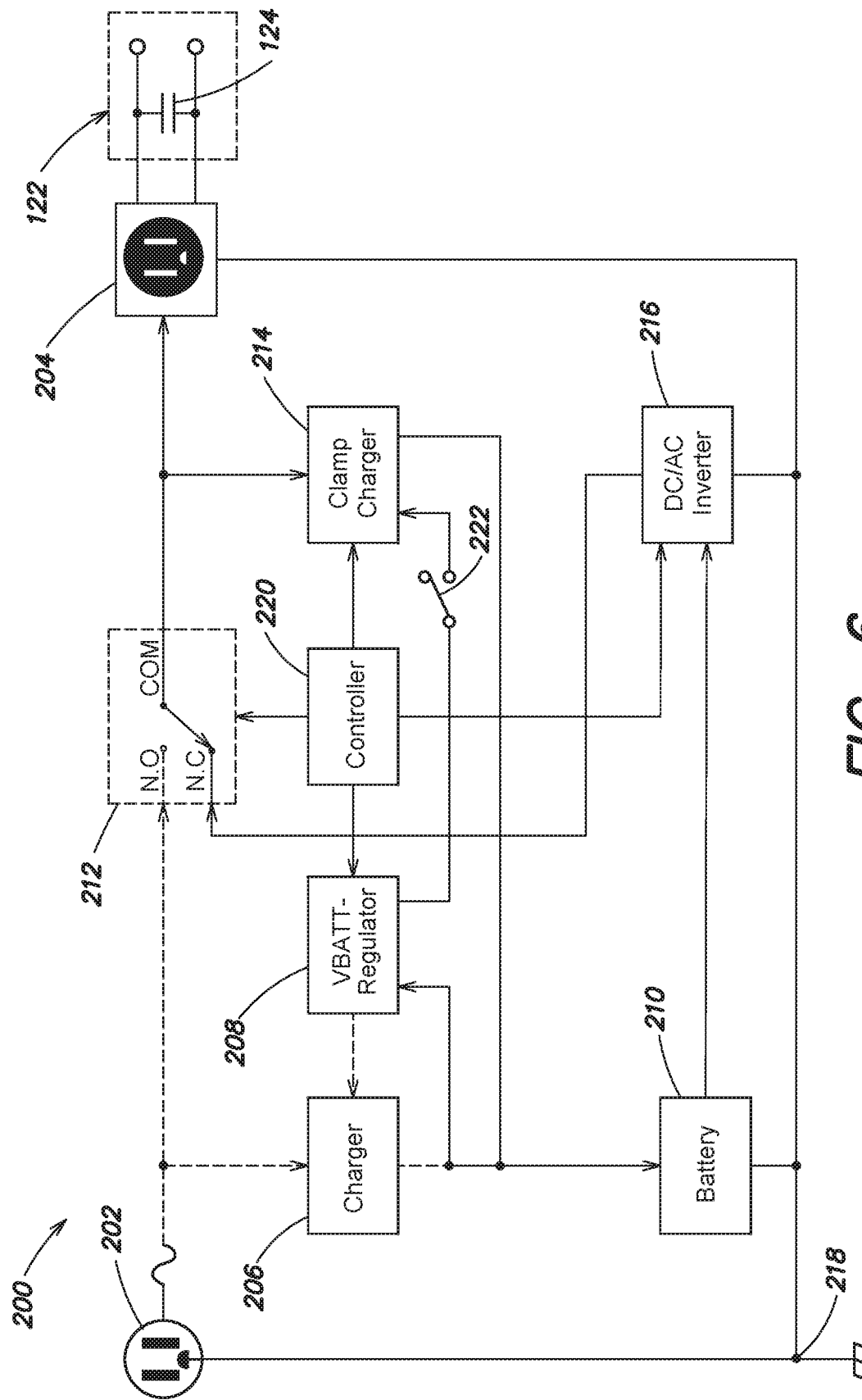
FIG. 6 illustrates a block diagram of the offline UPS in a battery mode of operation according to an embodiment.

The battery mode of operation will now be described with reference to FIG. 6. FIG. 6 illustrates the UPS 200 and the load 122 in the battery mode. In the illustrated embodiment, solid-line connections represent active (e.g., electrically-energized) connections, whereas dotted-line connections indicate inactive (e.g., electrically-deenergized) connections.

As discussed above with respect to act 312, electrical power is not provided from the input 202 during the battery mode of operation because no acceptable electrical power is available from the input 202. The battery 210 provides stored DC power to the inverter 216, which converts the DC power to AC power, and provides the AC power to the output 204 via the relay 212. The output 204 provides the AC power to the load 122 to power the load 122.

As discussed above, the load 122 may include a load capacitance 124 which stores reactive power. If the reactive power is not harvested, the reactive power will eventually be wasted (e.g., dissipated as heat) without being utilized. Accordingly, in some embodiments, the inverter 216 is configured to periodically hold the output of the inverter 216 at zero to allow the load capacitance 124 to discharge the stored reactive power to the clamp-charger circuit 214.

In some embodiments, the clamp-charger circuit 214 may condition the reactive power (e.g., convert the reactive power from a first voltage level to a second voltage level), and provide the conditioned power to the battery 210 to charge the battery 210. The voltage regulator 208 monitors the output of the clamp-charger circuit 214 and provides a voltage feedback signal to the clamp-charger circuit 214. After the load capacitance 124 discharges a specific amount of power, or after a specific time period elapses, the inverter 216 resumes providing AC power from the battery 210 to the output 204.

Figure 5:
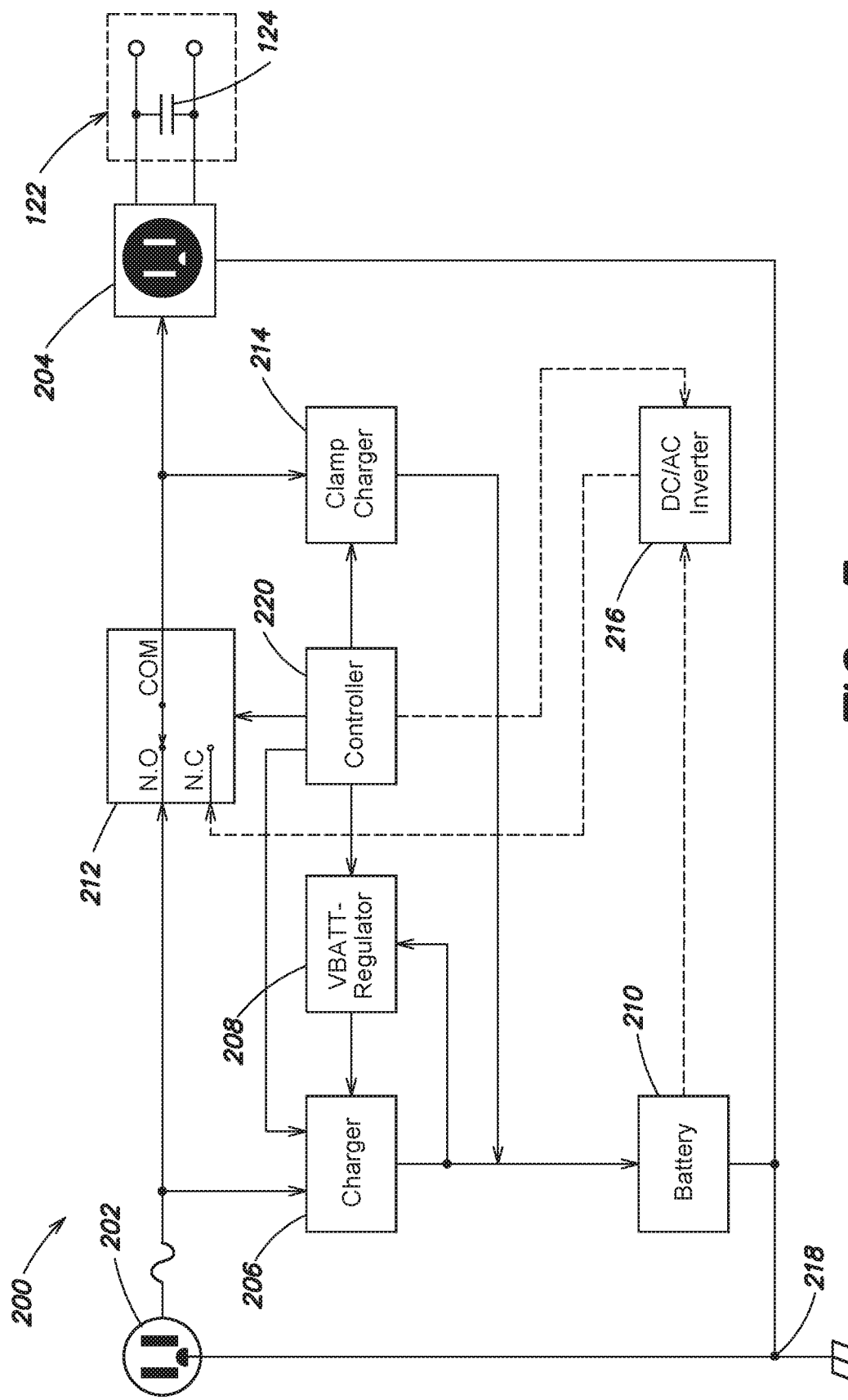
FIG. 5 illustrates a block diagram of the offline UPS in a line mode of operation according to an embodiment.

The line mode of operation will now be described with respect to FIG. 5. FIG. 5 illustrates the UPS 200 and the load 122 in the line mode. In the illustrated embodiment, solid-line connections represent active (e.g., electrically-energized) connections, whereas dotted-line connections indicate inactive (e.g., electrically-deenergized) connections.

As discussed above with respect to act 314, electrical power is provided from the input 202 to the output 204 and the charger 206 in the line mode of operation. The controller 220 actuates the relay 212 to connect the input 202 to the output 204 (for example, responsive to control signals received from the controller 220). The charger 206 receives electrical power from the input 202, and charges the battery 210 with the electrical power received from the input 202. The voltage regulator 208 monitors the output of the charger 206, and provides voltage feedback signals to the charger 206.

The clamp-charger circuit 214 includes a connection coupled between the relay 212 and the output 204, and is configured to receive at least a portion of the power provided from the input 202 to the output 204. The clamp-charger circuit 214 conditions the received power, and provides the conditioned power to the battery 210 to charge the battery 210 in parallel with the charger 206.

Figure 7:
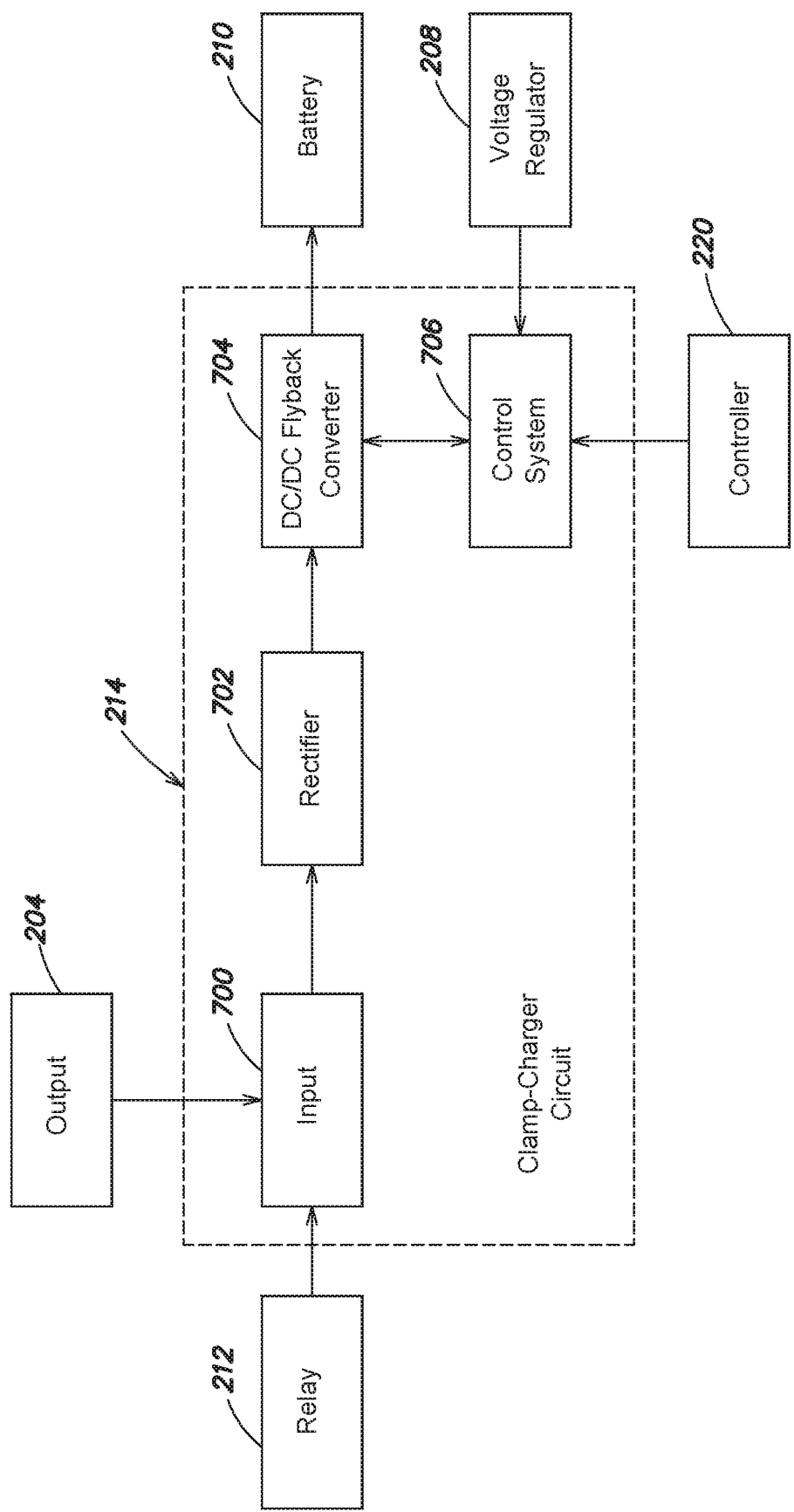
FIG. 7 illustrates a block diagram of a clamp-charger circuit according to an embodiment.

For example, as discussed in greater detail below with reference to FIG. 7, the clamp-charger circuit 214 may be implemented with a DC/DC flyback circuit topology. In some embodiments, the voltage regulator 208 is configured to sense parameters indicative of the power provided by the clamp-charger circuit 214 and, based on the sensed parameters, provide voltage feedback signals to the clamp-charger circuit 214.

In alternate embodiments, the voltage regulator 208 may be disconnected from the clamp-charger circuit 214 during the battery mode of operation. For example, the UPS 200 may include a switch 222 coupled between the voltage regulator 208 and the clamp-charger circuit 214. In some embodiments, the switch 222 may be maintained in an open and non-conducting position during the battery mode of operation, while in other embodiments, the switch 222 may be maintained in a closed and conducting position.

Accordingly, in contrast with the clamp circuit 114 discussed above with reference to FIG. 1, the clamp-charger circuit 214 is electrically active during the line mode of operation. More specifically, the clamp-charger circuit 214 is configured to charge the battery 210 in parallel with the charger 206 in the line mode of operation. Transferring a portion of the charging load from the charger 206 to the clamp-charger circuit 214 enables the battery 210 to be charged at substantially the same rate as the battery 110, while implementing a charger with a lower power rating (i.e., the charger 206) as compared to existing chargers (e.g., the charger 106).

For example, Table 1 illustrates differences in exemplary power specifications for the charger 106, the charger 206, the clamp circuit 114, and the clamp-charger circuit 214. In the example shown in Table 1, the energy storage capacity of the battery 110 is substantially similar to the energy storage capacity of the battery 210.

TABLE 1

|  | Conventional UPS | Disclosed UPS |
| --- | --- | --- |
| Charger Power | 15 W | 5 W |
| Clamp Circuit Power | 17 W | 17 W |
| Charging Time | 12 Hours | 12 Hours |

As illustrated by Table 1, in at least one example, the power rating of the charger 206 is approximately three times smaller than the power rating of the charger 106, and the power rating of the clamp circuit 114 is approximately equal to the power rating of the clamp-charger circuit 214. Despite the reduction in the power rating of the charger 206 as compared to the charger 106, and despite the substantially equivalent energy storage capacity of the battery 110 and the battery 210, both the battery 110 and the battery 210 can be charged in approximately 12 hours where the clamp-charger circuit 214 is utilized during the line mode of operation.

The clamp-charger circuit 214 will now be described in greater detail with reference to FIG. 7, which illustrates a block diagram of the clamp-charger circuit 214. The clamp-charger circuit 214 includes an input 700, a rectifier 702, a DC/DC flyback converter 704, and a control system 706, and is configured to be coupled to the output 204, the voltage regulator 208, the battery 210, the relay 212, and the controller 220.

The input 700 is coupled to the rectifier 702, and is configured to be coupled to an external AC power source (e.g., via the relay 212 or the output 204). The rectifier 702 is coupled to the input 700 and the DC/DC flyback converter 704. The DC/DC flyback converter 704 is coupled to the rectifier 702, the control system 706, and is configured to be coupled to the battery 210. The control system 706 is coupled to the DC/DC flyback converter 704, and is configured to be coupled to the voltage regulator 208 and the controller 220.

The input 700 is configured to receive an AC input signal and provide the AC input signal to the rectifier 702. The rectifier 702 provides full-wave rectification to the AC input signal to produce a rectified signal, and provides the rectified signal to the DC/DC flyback converter 704. In some embodiments, the input 700 may receive a DC input signal (e.g., DC reactive power discharged from a load capacitance) and provide the DC input signal to the rectifier 702, which provides the DC input signal to the DC/DC flyback converter 704.

The DC/DC flyback converter 704 converts the rectified signal from a first voltage level to a second voltage level, and provides the converted signal to the battery 210 to charge the battery 210. The control system 706 controls the operation of the DC/DC flyback converter 704 based at least in part on communication signals received from the voltage regulator 208 and the controller 220.

For example, the voltage regulator 208 may provide voltage feedback signals to the control system 706, the voltage feedback signals being indicative of an output of the clamp-charger circuit 214. The controller 220 may provide control signals to the control system 706 including, for example, a clamp-charger activation signal to turn on the clamp-charger circuit 214.

Figure 8:
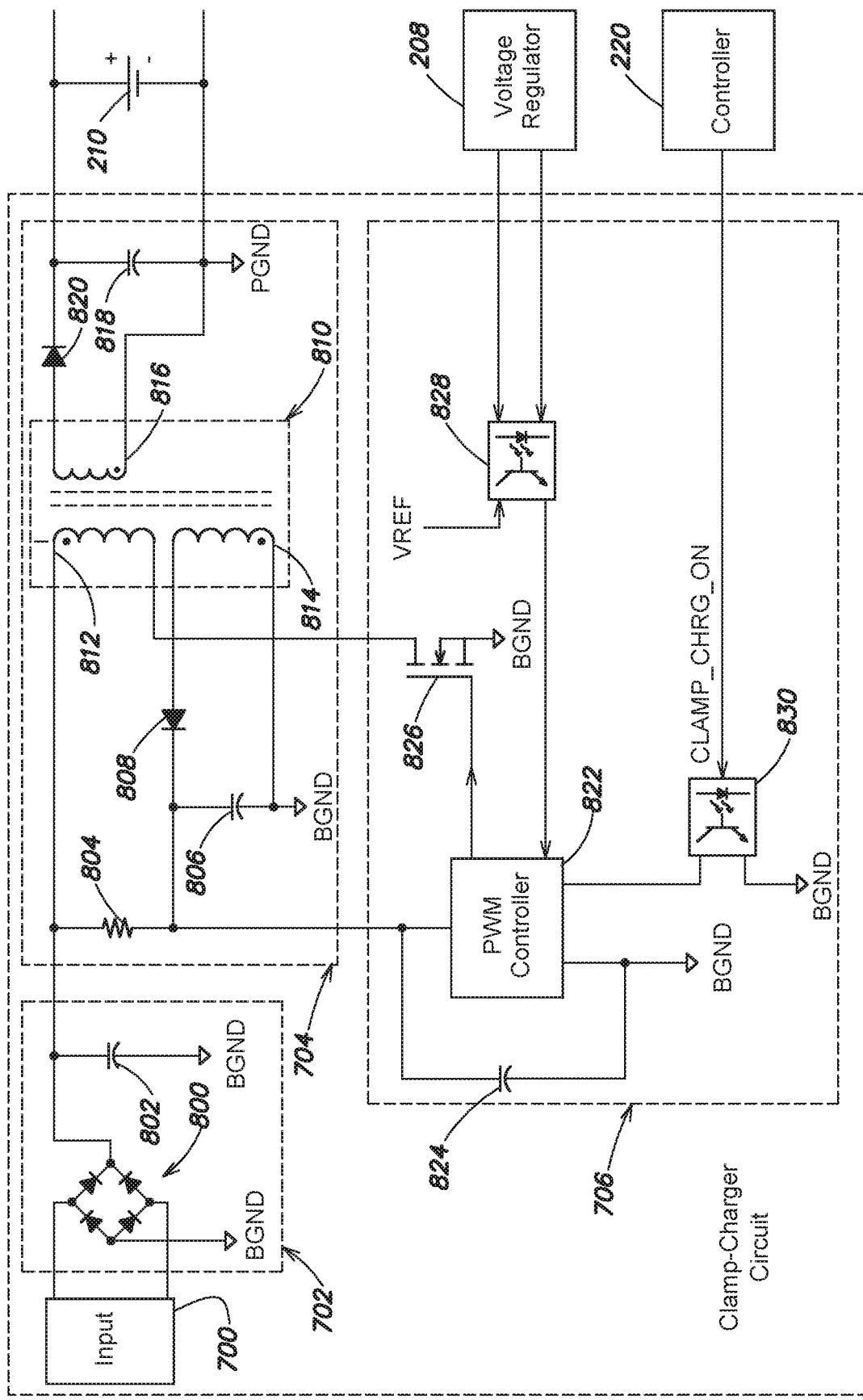
FIG. 8 illustrates a circuit diagram of the clamp-charger circuit according to an embodiment.

FIG. 8 illustrates a circuit diagram of the clamp-charger circuit 214 according to an embodiment. The clamp-charger circuit 214 includes the input 700, the rectifier 702, the DC/DC flyback converter 704, and the control system 706. The clamp-charger circuit 214 is configured to be coupled to the output 204, voltage regulator 208, the battery 210, the relay 212, and the controller 220.

The rectifier 702 includes a diode bridge rectifier 800 and a filter capacitor 802. The DC/DC flyback converter 704 includes a resistor 804, a first flyback capacitor 806, a first flyback diode 808, a transformer 810, a second flyback capacitor 818, and a second flyback diode 820. The transformer 810 includes a primary winding 812, a first secondary winding 814, and a second secondary winding 816. The control system 706 includes a Pulse Width Modulation (PWM) controller 822, a supply capacitor 824, a switch 826, a first optocoupler 828, and a second optocoupler 830.

The diode bridge rectifier 800 is coupled to the input 700, the filter capacitor 802, the resistor 804, and the primary winding 812. The filter capacitor 802 is coupled to the diode bridge rectifier 800, the resistor 804, and the primary winding 812 at a first terminal, and is coupled to a reference terminal (e.g., a ground terminal) at a second connection.

The resistor 804 is coupled to the diode bridge rectifier 800, the filter capacitor 802, and the primary winding 812 at a first connection, and is coupled to the first flyback capacitor 806, the cathode of the first flyback diode 808, the PWM controller 822, and the supply capacitor 824 at a second connection. The first flyback capacitor 806 is coupled to the resistor 804, the cathode of the first flyback diode 808, the PWM controller 822, and the supply capacitor 824 at a first connection, and is coupled to the first secondary winding 814 and a reference terminal at a second connection.

The flyback diode 808 is coupled to the resistor 804, the first flyback capacitor 806, the PWM controller 822, and the supply capacitor 824 at a cathode connection, and is coupled to the first secondary winding 814 at an anode connection. The primary winding 812 is coupled to the diode bridge rectifier 800, the filter capacitor 802, and the resistor 804 at a first connection, and is coupled to the switch 826 at a second connection.

The first secondary winding 814 is coupled to the anode of the first flyback diode 808 at a first connection, and is coupled to the capacitor 806 and a reference terminal at a second connection. The second secondary winding 816 is coupled to the anode of the second flyback diode 820 at a first connection, is coupled to the second flyback capacitor 818 and a reference terminal at a second connection, and is configured to be coupled to the battery 210 at the second connection.

The second flyback capacitor 818 is coupled to the cathode of the second flyback diode 820 at a first connection, and is configured to be coupled to the battery 210 at the first connection. The second flyback capacitor 818 is also coupled to the second secondary winding 816 at a second connection, and is configured to be coupled to the battery 210 at the second connection. The second flyback diode 820 is coupled to the second secondary winding 816 at an anode connection, is coupled to the second flyback capacitor 818 at a cathode connection, and is configured to be coupled to the battery 210 at the cathode connection.

The PWM controller 822 is coupled to the resistor 804, the first flyback capacitor 806, the cathode of the first flyback diode 808, and the supply capacitor 824 at a first connection, is coupled to a reference terminal at a second connection, is coupled to the second optocoupler 830 at a third connection, is coupled to the first optocoupler 828 at a fourth connection, and is coupled to a control terminal of the switch 826 at a fifth connection.

The supply capacitor 824 is coupled to the resistor 804, the first flyback capacitor 806, the cathode of the first flyback diode 808, and the PWM controller 822 at a first connection, and is coupled to a reference terminal at a second connection. The switch 826 is coupled to the primary winding 812 at a first connection, is coupled to a reference terminal at a second connection, and is coupled to the PWM controller 822 at a control connection.

The first optocoupler 828 is coupled to the PWM controller 822 at a first connection, is configured to be connected to a reference voltage source at a second connection, and is configured to receive voltage feedback signals from the voltage regulator 208. The second optocoupler 830 is coupled to the PWM controller 822 at a first connection, is coupled to a reference terminal at a second connection, and is configured to receive an activation signal from the controller 220.

The clamp-charger circuit 214 is generally configured to operate as follows. AC input power is received at the input 700 and is provided to the diode bridge rectifier 800. The diode bridge rectifier 800 rectifies the input AC power, and provides the rectified power to the primary winding 812 of the transformer 810. The filter capacitor 802 aids in rectification by filtering the rectified power signal. As discussed in greater detail below, current passes through the primary winding 812 when the switch 826 is in a closed and conducting position.

As current provided to the primary winding 812 increases, magnetic energy stored in the transformer 810 increases. A positive voltage is induced at the dotted terminals of the first secondary winding 814 and the second secondary winding 816 relative to the non-dotted terminals of the first secondary winding 814 and the second secondary winding 816 responsive to the increase in stored magnetic energy.

Due to the negative polarities of the first secondary winding 814 and the second secondary winding 816, the first flyback diode 808 and the second flyback diode 820 are reverse-biased. Accordingly, no current passes through the first secondary winding 814 and the second secondary winding 816. The first flyback capacitor 806 and the second flyback capacitor 818 discharge stored electrical energy to the supply capacitor 824 and the battery 210, respectively, while the first flyback diode 808 and the second flyback diode 820 are reverse-biased.

As the current provided to the primary winding 812 decreases, magnetic energy stored in the transformer 810 decreases. More specifically, the magnetic energy is released to induce a current in the first secondary winding 814 and the second secondary winding 816. The polarity across the first secondary winding 814 and the second secondary winding 816 is reversed, and the first flyback diode 808 and the second flyback diode 820 become forward-biased.

The induced current in the first secondary winding 814 and the second secondary winding 816 is provided to the first flyback capacitor 806 and the second flyback capacitor 818, respectively, to charge the first flyback capacitor 806 and the second flyback capacitor 818. As will be understood by one of ordinary skill in the art, the charging voltages provided to the first flyback capacitor 806 and the second flyback capacitor 818 are dependent upon the number of turns in the windings 812-816 of the transformer 810.

The current through the primary winding 812 is controlled by the switch 826, which is coupled in series between the primary winding 812 and a reference terminal. The switch 826, in turn, is controlled by the PWM controller 822. The PWM controller 822 communicates control signals to the switch 826 based at least in part on voltage feedback signals received from the voltage regulator 208 via the first optocoupler 828, and based on an activation signal received from the controller 220 via the second optocoupler 830. For example, where the voltage feedback signals received from the voltage regulator 208 indicate that the output voltage provided by the transformer 810 to the battery 210 exceeds a target voltage, the PWM controller 822 may be configured to control the switch 826 to correct for the overvoltage condition.

Alternatively, where the controller 220 determines that the clamp-charger circuit 214 should not be activated (e.g., during the standby mode of operation), the controller 220 can provide a deactivation signal to the second optocoupler 830. The PWM controller 822 may detect the actuation of the second optocoupler 830 and provide control signals to the switch 826 to disable current through the primary winding 812. Accordingly, the PWM controller 822 is operable to regulate the charging power provided to the battery 210 around a desired level.

Figure 9:
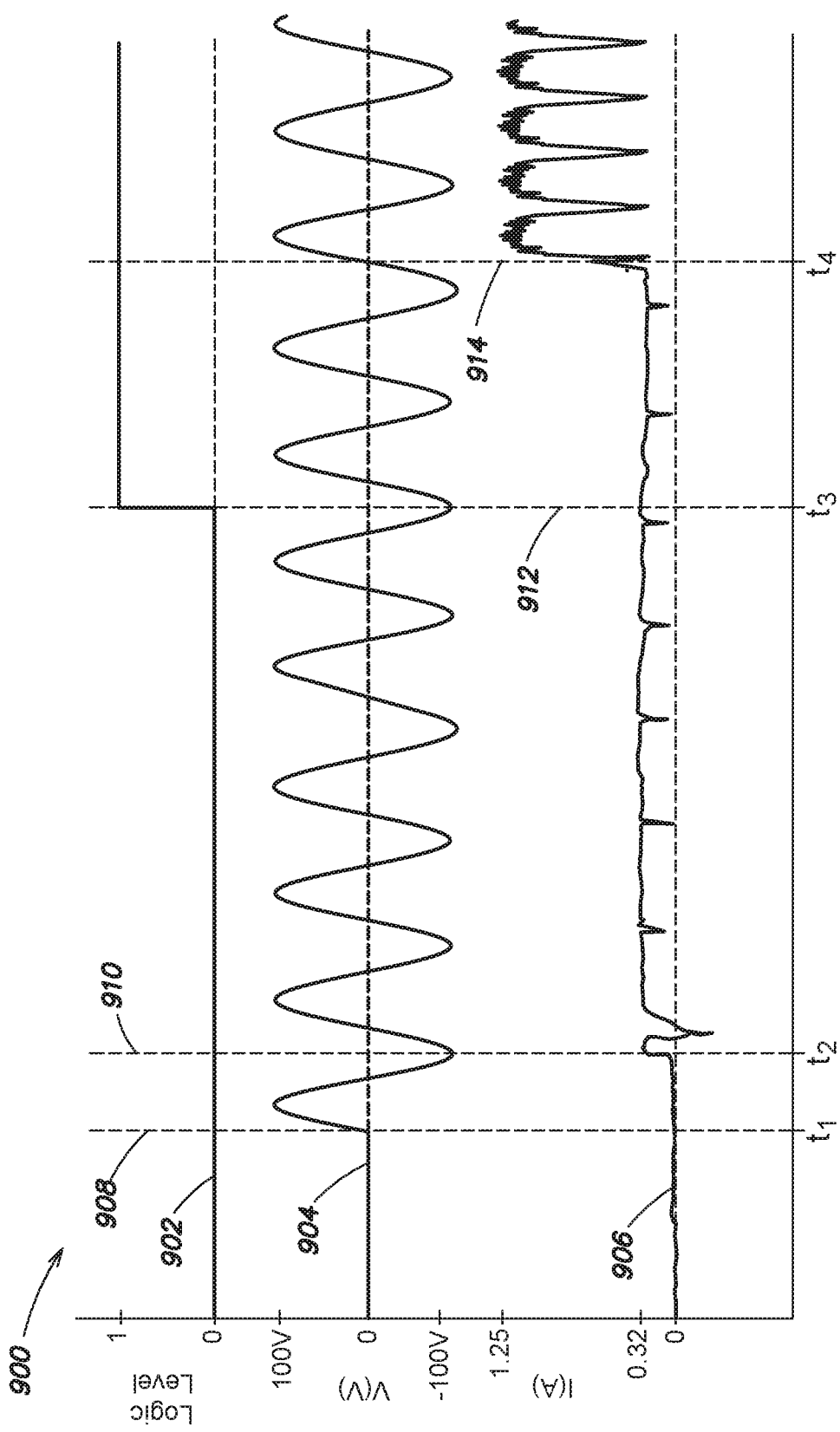
FIG. 9 illustrates a plurality of graphs of UPS measurement data.

FIG. 9 illustrates a plurality of graphs 900 to illustrate the foregoing principles according to an embodiment. The plurality of graphs 900 includes a UPS enable trace 902, a UPS input voltage trace 904, and a battery charging current trace 906. The UPS enable trace 902 indicates a UPS enablement signal, where a logical LOW signal (e.g., indicated by a "0" value) indicates that the UPS 200 is disabled from providing electrical power to the output 204, and a logical HIGH signal (e.g., indicated by a "1" value) indicates that the UPS 200 is enabled to provide electrical power to the output 204.

The UPS input voltage trace 904 indicates a UPS input voltage level. For example, the UPS voltage input trace 904 may indicate a voltage received at the input 202 of the UPS 200. The battery charging current trace 906 indicates a UPS battery charging current. For example, the battery charging current trace 906 may indicate a current provided to the battery 210.

Using the UPS 200 as an example, at a first time 908, AC input power is provided to the input 202 of the UPS 200. As indicated by the UPS input voltage trace 904, the AC input power is approximately sinusoidal. The UPS 200 does not provide the AC power to the output 204, because the UPS 200 is not enabled at the first time 908 as indicated by the UPS enable trace 902.

At a second time 910, the charger 206 begins to provide a charging current to the battery 210, as indicated by the battery charging current trace 906. In some examples, such as where the charger 206 has a 5 W power rating, the charger 206 provides a charging current of approximately 320 milliamps. The clamp-charger circuit 214 is not enabled at the second time 910. For example, the clamp-charger circuit 214 may not be enabled because the controller 220 has not communicated an enablement signal to the second optocoupler 830.

At a third time 912, the UPS 200 begins to provide electrical power to the output 204, as indicated by the UPS enable trace 902 transitioning from a logical LOW to a logical HIGH level. For example, the UPS 200 may be transitioning from a standby mode of operation to a line mode of operation at the third time 912.

At a fourth time 914, the clamp-charger circuit 214 begins to provide a charging current to the battery 210. In some examples, such as where the charger 206 has a 5 W power rating and the clamp-charger circuit 214 has a 17 W power rating, the charger 206 and the clamp-charger circuit 214 collectively provide a charging current of approximately 1.25 amps. As discussed above, in some embodiments, the energy storage capacity of the battery 210 is such that the battery 210 may be fully recharged by the 1.25 amps charging current in a maximum of 12 hours.

In light of the foregoing disclosure, it is to be appreciated that a modified clamp-charger circuit has been provided. The clamp-charger circuit is operable to charge a battery (e.g., a UPS battery) in both the line mode of operation and the battery mode of operation. In the battery mode of operation, the clamp-charger circuit recycles recycle reactive power stored in a load capacitance. In the line mode of operation, the clamp-charger circuit provides a charging current to the UPS battery in parallel with a primary battery charger.

In alternate embodiments, the clamp-charger circuit may be configured to operate differently. For example, the clamp-charger circuit may only be active during the battery mode of operation, or may only be active during the line mode of operation. During a first period of time, the clamp-charger circuit may be configured to operate during both the line mode of operation and the battery mode of operation. During a second period of time, the clamp-charger circuit may be configured to operate during only one mode of operation.

Accordingly, where the clamp-charger circuit is implemented, the power rating of the primary battery charger may be reduced because the primary battery charger is not the only source of a charging current. Reducing the power requirements of the primary battery charger allows the implementation of a smaller and less expensive battery charger.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of operating an Uninterruptible Power Supply (UPS), the method comprising:
   receiving, in a first mode of operation, AC power at an input of the UPS;
   providing, in the first mode of operation, the AC power to a charger and a clamp-charger circuit;
   charging, by the charger in the first mode of operation in parallel with the clamp-charger circuit, a UPS battery of the UPS with a first charging current derived from at least a portion of the AC power;
   charging, by the clamp-charger circuit in the first mode of operation in parallel with the charger, the UPS battery with a second charging current derived from at least a portion of the AC power;
   providing, in a second mode of operation, output power at an output of the UPS derived from the UPS battery; and
   charging, by the clamp-charger circuit in the second mode of operation, the UPS battery using a third charging current.

2. The method of claim 1, further comprising sensing, by a voltage regulator, parameters indicative of the first charging current and the second charging current in the first mode of operation.

3. The method of claim 2, further comprising generating, by the voltage regulator, feedback signals based on the sensed parameters and controlling the clamp-charger circuit based on the feedback signals.

4. The method of claim 3, further comprising regulating, by the clamp-charger circuit, the second charging current and the third charging current based on the feedback signals.

5. The method of claim 1, further comprising receiving, in the second mode of operation, power at the output of the UPS.

6. The method of claim 5, wherein receiving power at the output of the UPS includes receiving power discharged from a load capacitance.

7. The method of claim 1, wherein charging the UPS battery includes charging the UPS battery with the third charging current derived from at least a portion of the output power.

8. An Uninterruptible Power Supply (UPS) system, the UPS system comprising:
   an input configured to receive input AC power;
   an output configured to provide output AC power to a load;
   a battery charger coupled to the input and configured to couple to a battery, the battery charger being configured to:
      receive, in a first mode of operation, a first portion of the input AC power from the input; and
      provide, in the first mode of operation, a first charging current to the battery, the first charging current derived from the first portion of the input AC power; and
   a clamp-charger circuit coupled to the output and the battery, the clamp-charger circuit being configured to:
      receive, in the first mode of operation, a second portion of the input AC power from the input;
      provide, in the first mode of operation, a second charging current to the battery in parallel with the battery charger providing the first charging current to the battery, the second charging current derived from the second portion of the input AC power;

provide, in a second mode of operation, power derived from the battery to the load; and charge, in the second mode of operation, the battery.

9. The UPS system of claim 8, wherein the clamp-charger circuit is further configured to receive, at the output in the second mode of operation, power from a load capacitance.

10. The UPS system of claim 8, further comprising a voltage regulator coupled to the battery charger and the clamp-charger circuit.

11. The UPS system of claim 10, wherein the voltage regulator is configured to sense, in the first mode of operation, parameters indicative of the first charging current and the second charging current.

12. The UPS system of claim 11, wherein the voltage regulator is further configured to generate feedback signals based on the sensed parameters, and communicate the feedback signals to the clamp-charger circuit.

13. The UPS system of claim 12, wherein the clamp-charger circuit is a DC/DC flyback converter.

14. The UPS system of claim 13, wherein the DC/DC flyback converter includes:

an input configured to receive input power;

an output configured to be coupled to the battery;

a transformer coupled between the input and the output, the transformer including a primary winding;

a switch coupled in series with the primary winding;

at least one optocoupler configured to be coupled to the voltage regulator; and a Pulse Width Modulation (PWM) controller coupled to the at least one optocoupler and coupled to the switch.

15. The UPS system of claim 14, wherein the PWM controller is configured to:

receive the feedback signals from the at least one optocoupler;

generate switching signals based on the feedback signals; and provide the switching signals to the switch to control a current through the primary winding.

16. The UPS system of claim 15, wherein controlling the current through the primary winding includes controlling an output current provided by the transformer to the output.

17. An Uninterruptible Power Supply (UPS) system, the UPS system comprising:

an input configured to receive input AC power;

an output configured to provide output AC power to a load;

a battery charger coupled to the input and configured to couple to a battery, the battery charger being configured to:

receive, in a first mode of operation, a first portion of the input AC power from the input; and provide, in the first mode of operation, a first charging current to the battery, the first charging current derived from the first portion of the input AC power;

a clamp-charger circuit coupled to the output and the battery; and means for charging, in the first mode of operation, the battery with the clamp-charger circuit in parallel with the battery charger.

18. The UPS system of claim 17, further comprising means for receiving, in a second mode of operation, DC power from the load.

19. The UPS system of claim 18, wherein the means for charging the battery includes means for:

receiving, in the first mode of operation, a second portion of the input AC power from the input; and providing, in the first mode of operation, a second charging current to the battery, the second charging current derived from the second portion of the input AC power.

20. The UPS system of claim 17, further comprising means for providing, in the second mode of operation, a third charging current to the battery, the third charging current being derived from the battery.

* * * * *